United States Patent [19]

Chen

[11] Patent Number: 6,043,838
[45] Date of Patent: Mar. 28, 2000

[54] VIEW OFFSET ESTIMATION FOR STEREOSCOPIC VIDEO CODING

[75] Inventor: Xuemin Chen, San Diego, Calif.

[73] Assignee: General Instrument Corporation, Horsham, Pa.

[21] Appl. No.: 08/966,277

[22] Filed: Nov. 7, 1997

[51] Int. Cl.[7] .......................... H04N 13/00; H04N 13/02
[52] U.S. Cl. .................................. 348/42; 348/43; 348/47
[58] Field of Search ................................... 348/42, 43, 44, 348/46, 47, 48, 49, 51, 52, 54, 56, 58, 59, 60, 409, 413, 416; H04N 13/00, 13/02

[56] References Cited

U.S. PATENT DOCUMENTS

| | | | |
|---|---|---|---|
| 5,612,735 | 3/1997 | Haskell et al. | 348/43 |
| 5,619,256 | 4/1997 | Haskell et al. | 348/43 |
| 5,652,616 | 7/1997 | Chen et al. | 348/43 |
| 5,886,736 | 3/1999 | Chen | 348/43 |

Primary Examiner—Bryan Tung
Assistant Examiner—Tung Vo
Attorney, Agent, or Firm—Barry R. Lipsitz; Ralph F. Hoppin

[57] ABSTRACT

In a stereoscopic video transmission system, where an enhancement layer image is disparity predicted using a lower layer images, the lower layer image is made to more closely match the enhancement layer image by shifting the lower layer image to the right to compensate for inter-ocular camera lens separation. The motion vector search range for disparity prediction is reduced to improve coding efficiency. At an encoder, the optimal offset, x, between the enhancement layer image and the lower layer image is determined according to either a minimum mean error or a minimum mean squared error between the enhancement and lower layer images. The offset x is bounded by an offset search range X. The x rightmost pixel columns of the lower layer image are deleted, and the x leftmost columns of the lower layer image are padded to effectively shift the lower layer image to the right by x pixels to obtain the reference image for use in disparity predicting the enhancement layer image. For arbitrarily shaped images such as VOPs within a frame, the leftmost portion is deleted and the rightmost portion is padded. At a decoder, the offset value x is recovered if available and used to reconstruct the reference frame.

40 Claims, 9 Drawing Sheets

VIEW OFFSET ESTIMATION FOR STEREOSCOPIC VIDEO CODING

BACKGROUND OF THE INVENTION

The present invention relates to an apparatus and method for coding stereoscopic video data. In particular, a system for estimating the optimal offset of a scene between right and left channel views at the same temporal reference point is presented. The system reduces the motion vector search range for disparity (i.e., cross-channel or cross-layer) prediction to improve coding efficiency.

Digital technology has revolutionized the delivery of video and audio services to consumers since it can deliver signals of much higher quality than analog techniques and provide additional features that were previously unavailable. Digital systems are particularly advantageous for signals that are broadcast via a cable television network or by satellite to cable television affiliates and/or directly to home satellite television receivers. In such systems, a subscriber receives the digital data stream via a receiver/descrambler that decompresses and decodes the data in order to reconstruct the original video and audio signals. The digital receiver includes a microcomputer and memory storage elements for use in this process.

The need to provide low cost receivers while still providing high quality video and audio requires that the amount of data which is processed be limited. Moreover, the available bandwidth for the transmission of the digital signal may also be limited by physical constraints, existing communication protocols, and governmental regulations. Accordingly, various intra-frame data compression schemes have been developed that take advantage of the spatial correlation among adjacent pixels in a particular video picture (e.g., frame).

Moreover, inter-frame compression schemes take advantage of temporal correlations between corresponding regions of successive frames by using motion compensation data and block-matching motion estimation algorithms. In this case, a motion vector is determined for each block in a current picture of an image by identifying a block in a previous picture which most closely resembles the current block. The entire current picture can then be reconstructed at a decoder by sending data which represents the difference between the corresponding block pairs, together with the motion vectors that are required to identify the corresponding pairs. Block matching motion estimating algorithms are particularly effective when combined with block-based spatial compression techniques such as the discrete cosine transform (DCT).

Additionally, there has been increasing interest in proposed stereoscopic video transmission formats such as the Motion Picture Experts Group (MPEG) MPEG-2 Multiview Profile (MVP) system, described in document ISO/IEC JTC1/SC29/WG11 N1088 (ITU-T Recommendation H.262), entitled "Proposed Draft Amendment No. 3 to 13818-2 (Multi-view Profile)," November 1995, and its amendment 3; as well as the MPEG-4 Video Verification Model (VM) Version 3.0, described in document ISO/IEC JTC1/SC29/WG11 N1277, Tampere, Finland, July 1996, both of which are incorporated herein by reference.

Stereoscopic video provides slightly offset views of the same image to produce a combined image with greater depth of field, thereby creating a three-dimensional (3-D) effect. In such a system, dual cameras may be positioned about 2.5 inches, or 65 mm, apart to record an event on two separate video signals. The spacing of the cameras approximates the distance between left and right human eyes, i.e., the inter-ocular separation. Moreover, with some stereoscopic video camcorders, the two lenses are built into one camcorder head and therefore move in synchronism, for example, when panning across an image. The two video signals can be transmitted and recombined at a receiver to produce an image with a depth of field that corresponds to normal human vision. Other special effects can also be provided.

The MPEG MVP system includes two video layers which are transmitted in a multiplexed signal. First, a base (e.g., lower) layer represents a left view of a three dimensional object. Second, an enhancement (e.g., auxiliary, or upper) layer represents a right view of the object. Since the right and left views are of the same object and are offset only slightly relative to each other, there will usually be a large degree of correlation between the video images of the base and enhancement layers. This correlation can be used to compress the enhancement layer data relative to the base layer, thereby reducing the amount of data that needs to be transmitted in the enhancement layer to maintain a given image quality. The image quality generally corresponds to the quantization level of the video data.

The MPEG MVP system includes three types of video pictures; specifically, the intra-coded picture (I-picture), predictive-coded picture (P-picture), and bi-directionally predictive-coded picture (B-picture). Furthermore, while the base layer accommodates either frame or field structure video sequences, the enhancement layer accommodates only frame structure. An I-picture completely describes a single video picture without reference to any other picture. For improved error concealment, motion vectors can be included with an I-picture. An error in an I-picture has the potential for greater impact on the displayed video since both P-pictures and B-pictures in the base layer are predicted from I-pictures. Moreover, pictures in the enhancement layer can be predicted from pictures in the base layer in a cross-layer prediction process known as disparity prediction. Prediction from one frame to another within a layer is known as temporal prediction.

In the base layer, P pictures are predicted based on previous I or P pictures. The reference is from an earlier I or P picture to a future P-picture and is known as forward prediction. B-pictures are predicted from the closest earlier I or P picture and the closest later I or P picture.

In the enhancement layer, a P-picture can be predicted from (a) the most recently decoded picture in the enhancement layer, (b) the most recent base layer picture, in display order, or (c) the next lower layer picture, in display order. Case (b) is used usually when the most recent base layer picture, in display order, is an I-picture.

Moreover, a B-picture in the enhancement layer can be predicted using (d) the most recent decoded enhancement layer picture for forward prediction, and the most recent lower layer picture, in display order, (e) the most recent decoded enhancement layer picture for forward prediction, and the next lower layer picture, in display order, for backward prediction, or (f) the most recent lower layer picture, in display order, for forward prediction, and the next lower layer picture, in display order, for backward prediction. When the most recent lower layer picture, in display order, is an I-picture, only that I-picture will be used for predictive coding (e.g., there will be no forward prediction).

Note that only prediction modes (a), (b) and (d) are encompassed within the MPEG MVP system. The MVP system is a subset of MPEG temporal scalability coding, which encompasses each of modes (a)–(f).

In one optional configuration, the enhancement layer has only P and B pictures, but no I pictures. The reference to a future picture (i.e., one that has not yet been displayed) is called backward prediction. Note that no backward prediction occurs within the enhancement layer. Accordingly, enhancement layer pictures are transmitted in display order. There are situations where backward prediction is very useful in increasing the compression rate. For example, in a scene in which a door opens, the current picture may predict what is behind the door based upon a future picture in which the door is already open.

B-pictures yield the most compression but also incorporate the most error. To eliminate error propagation, B-pictures may never be predicted from other B-pictures in the base layer. P-pictures yield less error and less compression. I-pictures yield the least compression, but are able to provide random access.

For disparity prediction, e.g., where a lower layer image is used as a reference image for an enhancement layer image, either alone or in combination with an enhancement layer reference image. The enhancement layer image is motion compensated by finding a best-match image in the reference image by searching a predefined search area, then differentially encoding the pixels of the enhancement layer image using the pixels of the best-match image of the reference image. A motion vector which defines the relative displacement of the best match image to the coded enhancement layer region is transmitted with the differentially encoded pixel data to allow reconstruction of the enhancement layer image at a decoder. Processing may occur on a macroblock by macroblock basis.

However, the processing and memory storage requirements for disparity prediction are increased when the motion vector search range is increased. Additionally, inefficient variable length coding (e.g., Huffman coding) of disparity vectors results. This results in more expensive and/or slower encoding and decoding apparatus. Accordingly, it would be advantageous to have a system to improve the coding efficiency of disparity predicted enhancement layer images in a stereoscopic video system. The system should account for the inter-ocular separation of a stereoscopic video camera to provide a shifted lower layer image which more closely matches the enhancement layer image. The system should be compatible with various image sizes, including rectangular as well as arbitrarily shaped images.

The system should further be compatible with various existing and proposed video coding standards, such as MPEG-1, MPEG-2, MPEG-4, H.261 and H.263.

The system should provide for the transmission of an offset value for use by a decoder in reconstructing a reference frame. The system should also be effective with video standards that do no allow for the transmission of an offset value by reducing the motion vector search range at an encoder. The technique should be suitable for both still images and sequences of images.

The present invention provides a system having the above and other advantages.

SUMMARY OF THE INVENTION

In accordance with the present invention, a method and apparatus are presented for improving coding efficiency in a stereoscopic video transmission system by compensating for inter-ocular camera lens separation.

A method for prediction of an enhancement layer image in an enhancement layer of a stereoscopic video signal using a lower layer image in a lower layer thereof comprises the steps of determining an optimal offset, x, between the enhancement layer image and the lower layer image according to either a minimum mean error, or a minimum mean squared error, and shifting the lower layer image according to the optimal offset to obtain a reference image for use in disparity predicting the enhancement layer image. The shifting is accomplished by deleting the last (e.g., rightmost) x pixel columns of the lower layer image and padding the first (e.g., leftmost) x pixel columns according to the pre-existing first pixel column (i.e., the leftmost column before shifting).

The enhancement layer image is disparity predicted from the reference image using motion compensation, and a best-match image, such as a macroblock, is obtained in the reference image using a search range which is reduced relative to a search range of the lower layer image without the shifting.

An estimated offset may be determined according to a camera focus parameter and an inter-ocular separation, in which case the lower layer image can be searched in a range determined by the estimated offset to find the optimal offset.

The enhancement layer image and the lower layer image may comprise video object planes or other arbitrarily shaped images as well as rectangular images (e.g., frames).

A new optimal offset x may be determined when a scene change is detected for the lower layer image. If a scene change is not detected, an offset from a prior image in the lower layer can be used as the optimal offset x. Optionally, a new optimal offset x may be determined for a new group of pictures in the lower layer.

The optimal offset x may be transmitted in the stereoscopic video signal for use by a decoder in recreating the reference image.

For the minimum mean error, the optimal offset x is determined such that the value $$Dist\_L^1(x) = \frac{1}{h(w-x)} \sum_{i=0}^{(w-x-1)} \sum_{j=0}^{(h-1)} |\{y_L(i+x,j) - y_E(i,j)\}|$$

is minimized, where $y_L$ and $y_E$ represent luminance pixel values of the lower and enhancement layer images, respectively, i and j are horizontal and vertical Cartesian coordinates, respectively, in the lower and enhancement layer images, h is the height of the lower layer image, w is the width of the lower layer image, the lower layer image is a left-view image and the enhancement layer image is a right-view image.

For the minimum mean squared error, the optimal offset x is determined such that the value $$Dist\_L^2(x) = \frac{1}{h(w-x)} \sum_{i=0}^{(w-x-1)} \sum_{j=0}^{(h-1)} \{y_L(i+x,j) - y_E(i,j)\}^2.$$

The offset for chrominance data is $\lfloor x/2 \rfloor$ for 4:2:0 video.

A corresponding apparatus and decoder are also presented.

DETAILED DESCRIPTION OF THE INVENTION

A method and apparatus are presented for estimating the optimal offset of a scene between right and left channel views in a stereoscopic video system.

Figure 1:
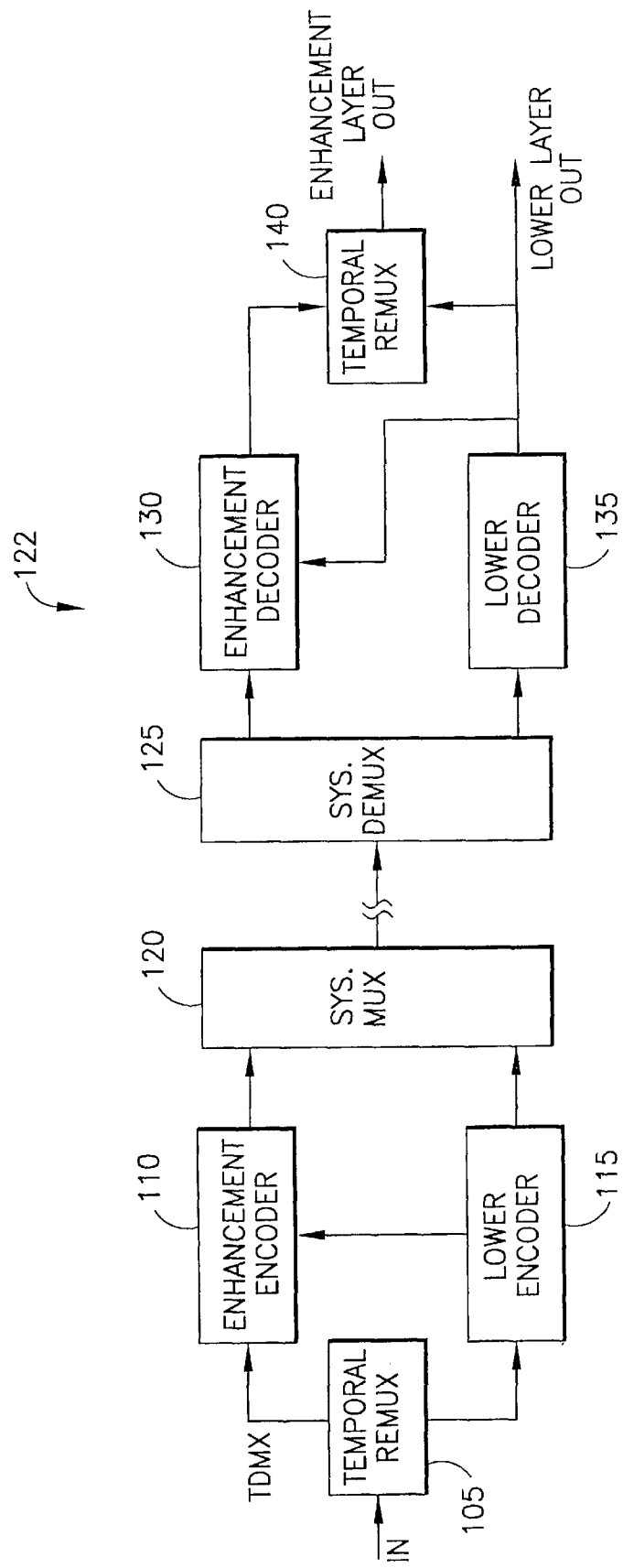
FIG. 1 is a block diagram of a coder/decoder structure for stereoscopic video.

FIG. 1 is a block diagram of a coder/decoder structure for stereoscopic video. The MPEG MVP standard and similar systems involve coding of two video layers, including a lower layer and an enhancement or upper layer. For such an application, the lower layer is assigned to a left view while the enhancement layer is assigned to a right view. In the coder/decoder (e.g., codec) structure of FIG. 1, the lower layer and enhancement layer video sequences are received by a temporal remultiplexer (remux) 105. Using time division multiplexing (TDMX), the enhancement layer video is provided to an enhancement encoder 110, while the base layer video is provided to a lower encoder 115. Note that the lower layer video data may be provided to the enhancement encoder 110 for disparity prediction.

The encoded enhancement and base layers are then provided to a system multiplexer 120 for transmission to a decoder, shown generally at 122, as a transport stream. The transmission path is typically a satellite link to a cable system headend or directly via satellite to a consumer's home. At the decoder 122, the transport stream is demultiplexed at a system demultiplexer 125. The encoded enhancement layer data is provided to an enhancement decoder 130, while the encoded lower layer data is provided to a lower decoder 135. Note that decoding is preferably carried out concurrently with the lower and enhancement layers in a parallel processing configuration. Alternatively, the enhancement decoder 130 and lower decoder 135 may share common processing hardware, in which case decoding may be carried out sequentially, one picture at a time.

The decoded lower layer data is output from the lower decoder 135 as a separate data stream, and is also provided to a temporal remultiplexer 140. At the temporal remultiplexer 140, the decoded base layer data and the decoded enhancement layer data are combined to provide an enhancement layer output signal as shown. The enhancement and lower layer output signals are then provided to a display device for viewing.

Figure 2:
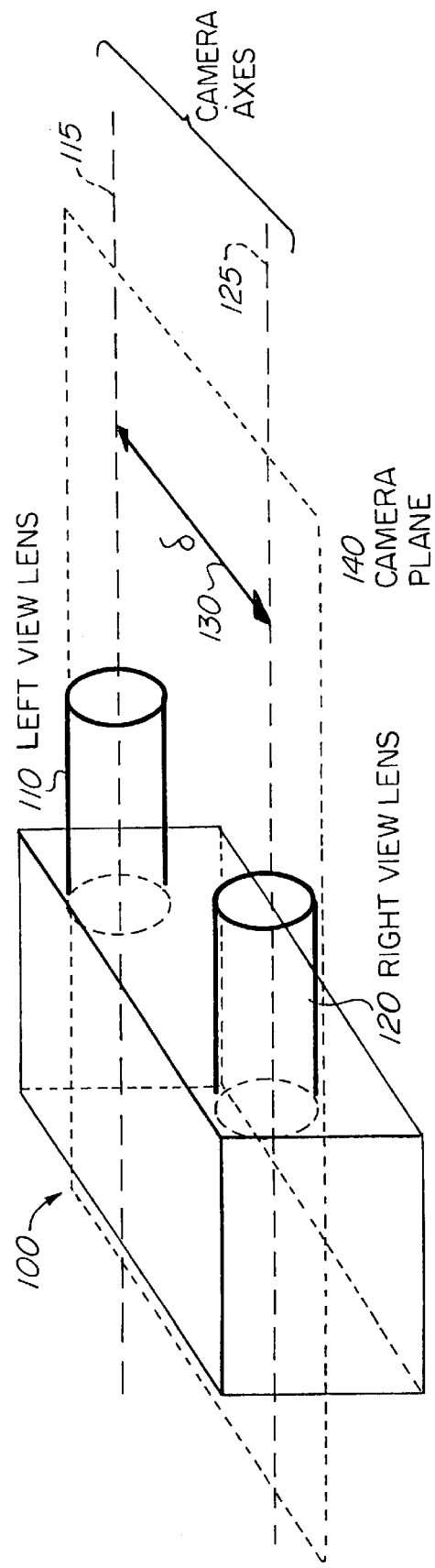
FIG. 2 is a schematic diagram of a stereoscopic video camera model.

FIG. 2 is a schematic diagram of a stereoscopic video camera model. The camera apparatus, shown generally at 100, includes a right view lens 120 and a left view lens 110 with respective axes 125 and 115 which are separated by an inter-ocular distance δ (130), typically 65 mm. The axes 115 and 125 intersect a camera plane 140. The camera apparatus 100 includes two identical cameras, each with a respective lens, so that two separate recordings of a scene are obtained. The cameras are oriented with parallel axes and coplanar image sensors, such as charge coupled devices (CCDs). Thus, the displacement (disparity) of two images of a scene at a given moment is mainly horizontal and is created by the horizontal separation of the lenses 110 and 120.

A stereoscopic imaging system replicates the principle of human vision system to provide two views of a scene. By presenting the appropriate views on a suitable display to the corresponding left- and right-eyes of a viewer, two slightly different perspective views of the scene are imaged on each retina. The brain then fuses these images into one view, and the viewer experiences the sensation of stereopsis (stereoscopic vision), which provides added realism through improved depth perception.

To efficiently transmit stereoscopic video data, coding (e.g., compression) of the images of the two views must be efficient. Efficient coding of a stereoscopic video depends not only on motion compensation, but also on disparity (e.g., cross-channel or cross-layer) prediction. By reducing a motion vector search range for disparity prediction between left- and right-view pictures, a low complexity encoder can be implemented. This is achieved by optimally estimating the global location-offset of a scene between pictures of two views at the same temporal reference point.

Figure 8:
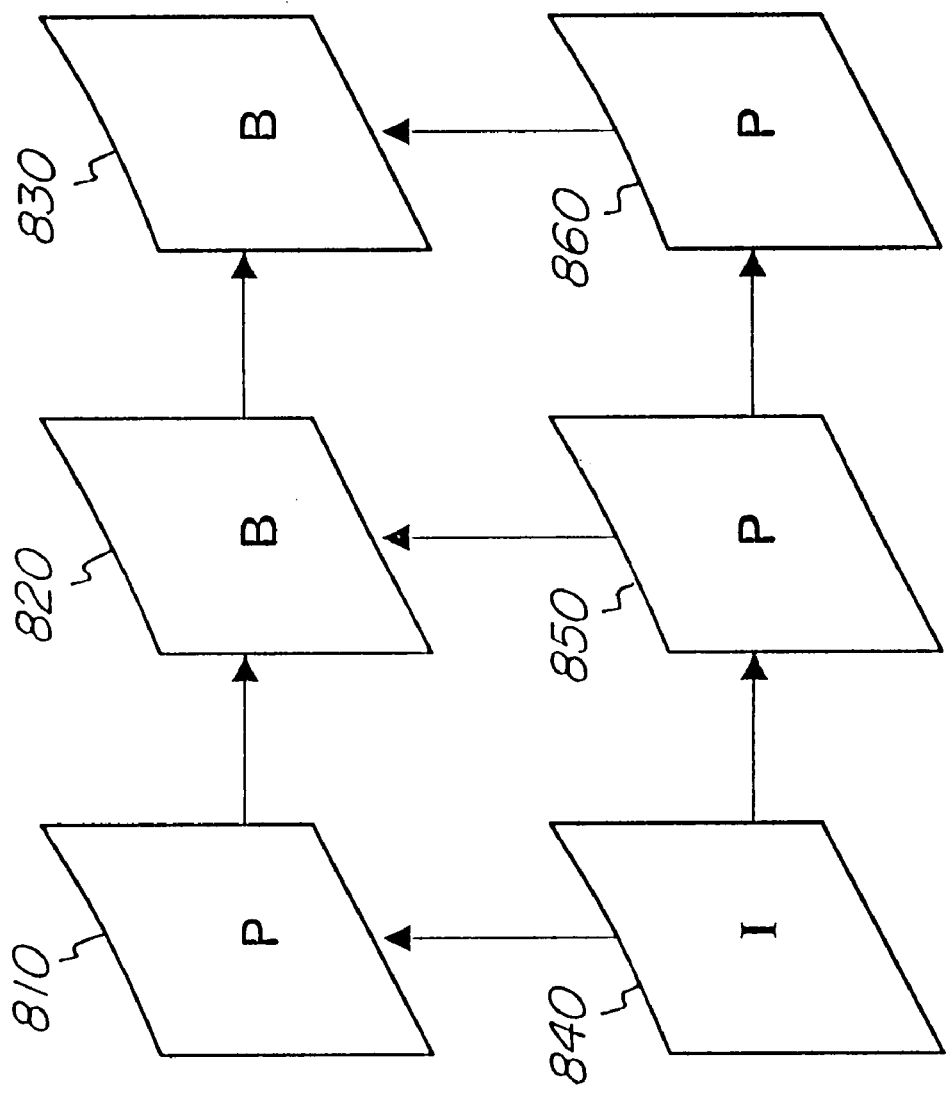
FIG. 8 illustrates disparity prediction and motion vector searching in accordance with the present invention.

The system presented herein may be used a performance enhancement option of the MPEG-2 Multi-View Profile (MVP) and MPEG-4 Video Verification Model (VM) (Version 3.0 and above) experiments for disparity prediction of stereoscopic video coding. MVP (or MPEG-4 MV 3.0) involves two layer coding, namely a lower or base layer and an enhancement layer. For stereoscopic video coding, the lower layer is assigned to the left view and the enhancement layer is assigned to the right view. The disparity estimation/prediction modes of the enhancement layer in MVP for P- and B-pictures consist of a macroblock-based block matching technique. In an MVP decoder, these prediction modes are shown in FIGS. 3, 4 and 8.

With stereoscopic video coding, a horizontal disparity vector for each disparity-predicted macroblock is expected because of the offset of the view points. In fact, this causes inefficient variable length (Huffman) coding (VLC) of these disparity vectors. The present invention addresses the problem of how to determine the horizontal offset of stereoscopic views such that the coding of estimated disparity vectors becomes more efficient.

In accordance with the present invention, the left-view image is offset by an appropriate number of pixels such that the displacement between the offset left-view image and the right-view image can be reduced. The disparity prediction based on this new image pair is therefore more efficient.

Figure 3:
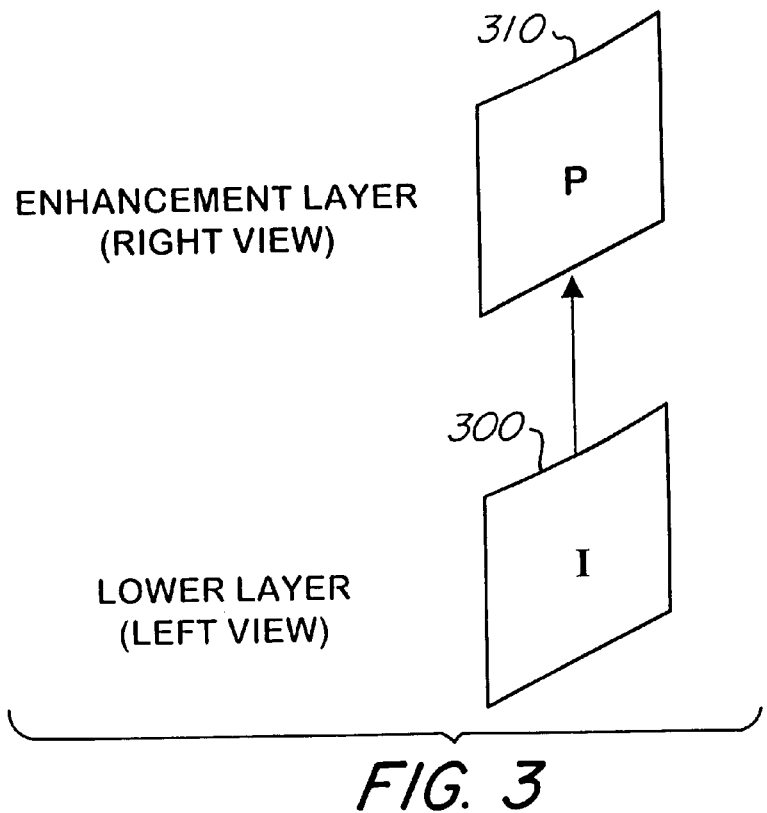
FIG. 3 is an illustration of a disparity prediction mode for P-pictures in the enhancement layer.
Figure 4:
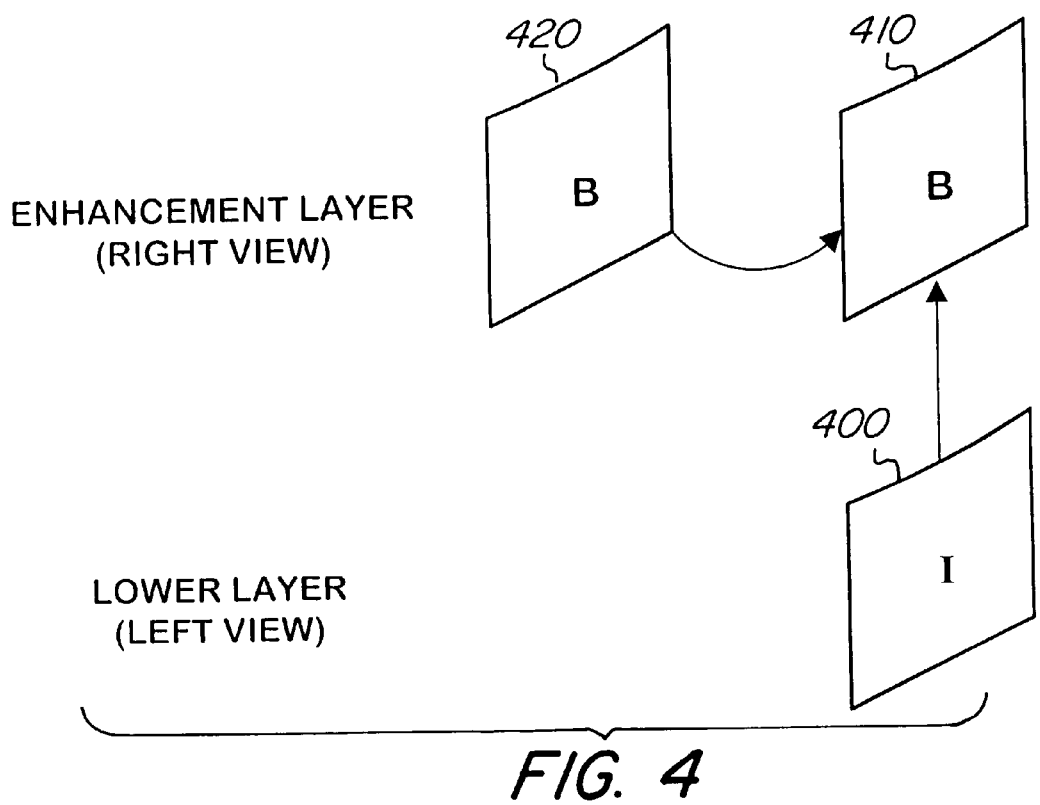
FIG. 4 is an illustration of an enhancement layer predict mode for B-pictures.

FIG. 3 is an illustration of a disparity prediction mode for P-pictures in the enhancement layer. Here, a P-picture 310 in the enhancement layer is disparity predicted using a temporally coincident I-picture 300 in the lower layer.

FIG. 4 is an illustration of an enhancement layer predict mode for B-pictures. Here, a B-picture 410 in the enhancement layer is predicted using both forward prediction and disparity prediction. Specifically, the B-picture 410 is forward predicted using another B-picture 420, which is the most recent decoded enhancement layer picture, and an I-picture 400, which is the most recent lower layer picture, in display order.

Figure 5:
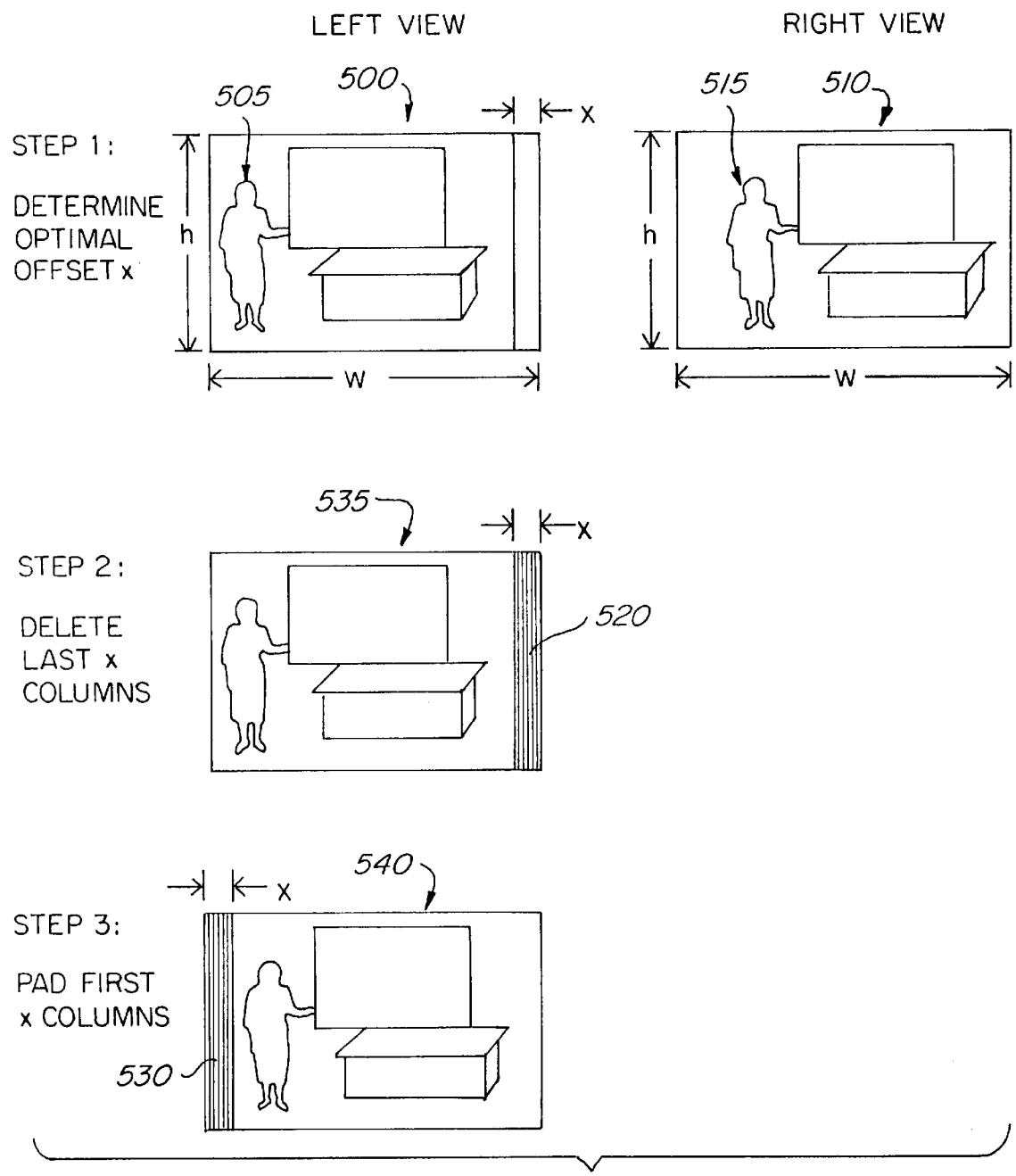
FIG. 5 illustrates processing of a left-view picture in accordance with the present invention.

FIG. 5 illustrates processing of a left-view picture in accordance with the present invention. A global horizontal position offset technique of the present invention improves coding efficiency while maintaining compatibility with existing stereoscopic coding standards. The global horizontal position offset method obtains a horizontal position shift of the left-view image such that the distortion between the (shifted) left-view image and the corresponding right-view image is minimized. This technique is applicable to arbitrarily shaped images such as Video Object Planes (VOP) as discussed in the MPEG-4 standard as well as rectangular images, e.g., a video frame or picture or sub-portion thereof as used in the MPEG-2 MVP standard. Specifically, a VOP in a left-view image is shifted to the right by deleting the x leftmost pixels which extend vertically on the VOP, i.e., at the leftmost edge of the VOP, and padding x pixels starting at the rightmost edge of the VOP. Thus, the rightmost edge is extended horizontally by x pixels. The position of the VOP is thus shifted with respect to the left-view frame in which it is situated as well as with respect to the corresponding VOP in the right-view image. Generally, the rightmost and leftmost portions of the left-view frame are unchanged, assuming the VOP does not extend to the vertical boundaries of the frame.

In FIG. 5, a left-view image 500 and right-view image 510 are shown. Parameters h and w denote the high and width, respectively, for both images. For example, for NTSC video, h=480 and w=704, and for PAL video, h=576 and w=704). Parameters $y_L(i,j)$ and $y_R(i,j)$ represent the luminance pixel values of the left- (or lower) and right-view images, respectively. The parameter $y_R(i,j)$ may be referred to as $y_E(i,j)$ where the subscript "E" denotes the enhancement layer.

The technique is discussed assuming the left-view image is in the lower layer and the right-view image is in the enhancement layer. However, the technique is easily adapted for use in a stereoscopic video system where the right-view image is in the lower layer and the left-view image is in the enhancement layer.

The left-view image 500 includes a feature 505, while the right-view image 510 includes the same feature 515 but in a different relative position within the frame. Specifically, the image 500 is relatively offset to the left of the image 510 by a distance x. In a first step, the value x is the horizontal offset which is to be determined, and is assumed to fall within a pre-assigned or pre-determined range X, that is, 0<x<X.

The global horizontal position offset technique in accordance with a first embodiment of the present invention is to find the horizontal offset integer value x such that:

$$Dist\_L^2(x) = \frac{1}{h(w-x)} \sum_{i=0}^{(w-x-1)} \sum_{j=0}^{(h-1)} \{y_L(i+x, j) - y_E(i, j)\}^2$$

is minimized, where $y_L$ and $y_E$ represent the luminance pixel values of the lower and enhancement layer images, respectively, i and j are, horizontal and vertical Cartesian coordinates, respectively, in the lower and enhancement layer images, h is the height of each image, and w is the width of each image. This techniques uses a minimum mean squared error between pixel values of the enhancement and lower layer images. Note that h(w-x) denotes multiplication, not a function of h. An exhaustive search is performed horizontally for 0<x<X to find the offset x such that $Dist\_L^2(x)$ is a minimum.

In another embodiment of the present invention, the offset value x is found such that:

$$Dist\_L^1(x) = \frac{1}{h(w-x)} \sum_{i=0}^{(w-x-1)} \sum_{j=0}^{(h-1)} |\{y_L(i+x, j) - y_E(i, j)|$$

is a minimum. This technique, which uses a minimum mean error between pixel values of the enhancement and lower layer images, can be implemented with reduced computational requirements.

In another embodiment of the present invention, a horizontal offset $x_{est}$ is estimated by using a camera focus parameter and the inter-ocular separation δ. For example, an estimated offset of ten pixels (e.g., +/−5) may be used. Then, an exhaustive horizontal search is performed for max{$x_{est}$− 5, 0}<i<{($x_{est}$+5} to find the offset x such that $Dist\_L^1(x)$ or $Dist\_L^2(x)$ is a minimum.

A left-view reference frame for disparity estimation and prediction is obtained as follows. After determining the horizontal offset x in the encoder, a reference frame is constructed from the original and reconstructed left-view images for disparity estimation/prediction of the right-view image. If the video standard allows the offset value x to be transmitted to a decoder, the offset x is extracted at the decoder, and the reference frame is reconstructed from the decoded left-view image for disparity prediction/compensation of the right-view image. The offset may be transmitted in the user data portion of a picture header, for example.

The construction process of the reference frame for luminance pixels is achieved, in a second step, by deleting the last x columns of the left-view image. At the encoder, the original left-view image is used, while at the decoder, the decoded left-view image is used. Referring to the left-view image 535, the last x columns 520 at the right-hand side of the image 535 are deleted.

In a third step, for each row of the left-view image 540, fill x pixels in the beginning of the row with the first pixel value of the row. The fill (e.g., padding) process can be accomplished as described in the MPEG-4 standard. The padded region 530 is shown at the left-hand side of the image 540. As a result of the foregoing steps, an offset or shifted left-view image 540 is obtained that more closely matches the corresponding right-view image.

For the chrominance pixel data, the construction process of the reference frame for disparity prediction consists of the same steps given, but with a horizotal offset of $\lfloor x/2 \rfloor$, that is, x/2 with rounding down to the next integer. This assumes a 4:2:0 video format. The offset may be modified for other formats as required.

Figure 6:
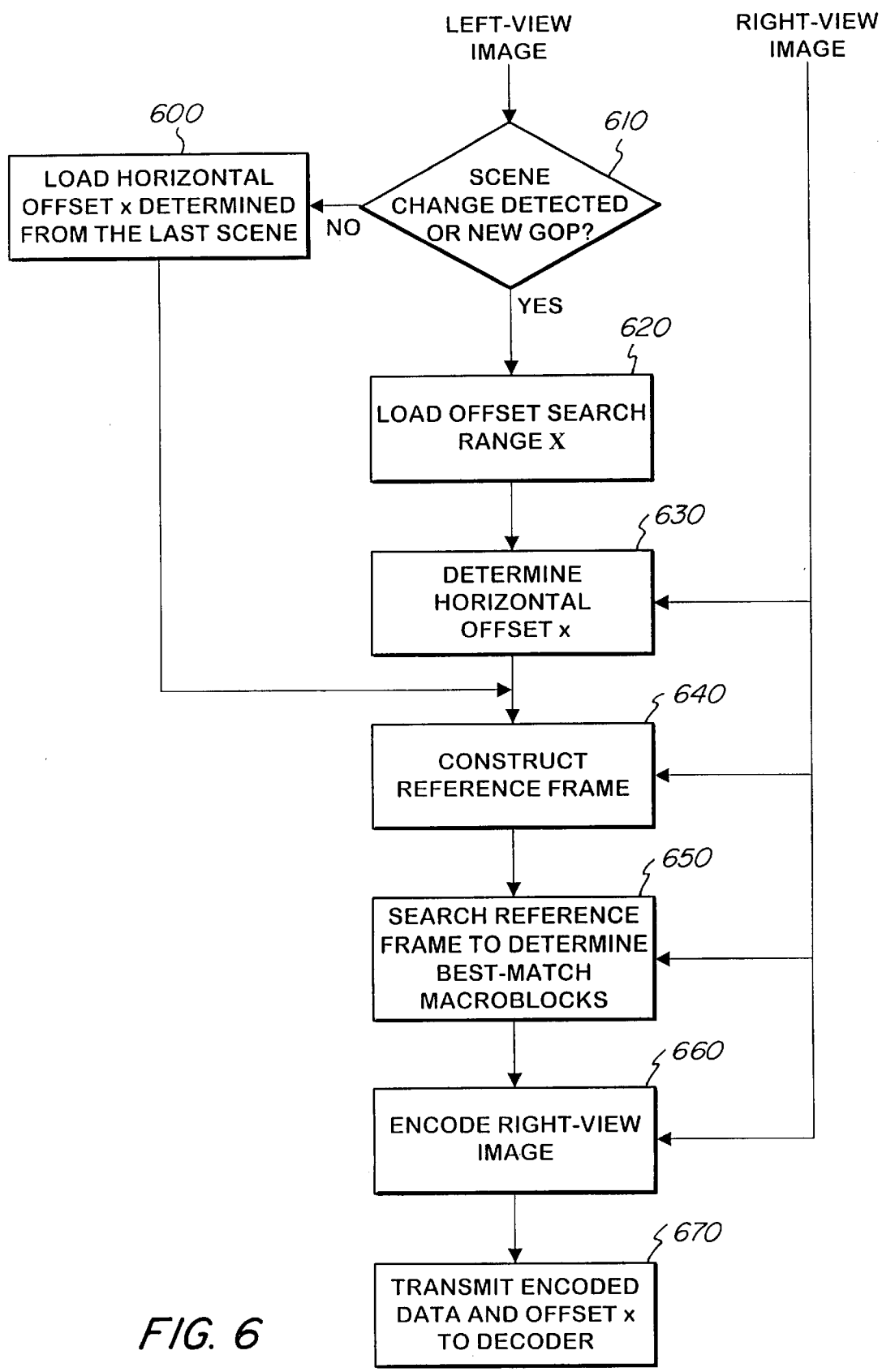
FIG. 6 illustrates an encoder process flow in accordance with the present invention.

FIG. 6 illustrates an encoder process flow in accordance with the present invention. The process shown corresponds to the case where the horizontal offset value x can be transmitted to a decoder. For the case where the horizontal offset cannot be transmitted, e.g., with the MPEG-2 MVP standard, the horizontal offset value x can still be used to reduce the complexity of disparity vector searching in the encoder, as discussed in connection with FIGS. 8 and 9.

The offset value x may be determined according to various protocols. For example, x may be computed and stored for each successive image in a video sequence. However, this may be computationally burdensome and unnecessary. Alternatively, the offset x may be determined whenever a scene change is detected, or at the start of a new group of pictures (GOP). A group of pictures (GOP) indicates one or more consecutive pictures which can be decoded without reference to pictures in another GOP. The selection of an optimum criteria for recalculating the offset x should be based on implementation complexity and video characteristics.

If the offset x is not newly recalculated for the current image, the previous stored offset can be used.

The left-view image is provided to a block 610, where it is determined whether a scene change or a new GOP is detected. If so, at block 620, the offset search range X (where 0<x<X) is loaded, e.g., into memory for use by a microcomputer. If not, at block 600, the horizontal offset x which was determined from the last scene is used.

At block 630, the offset x is determined using either the minimum mean error or the minimum mean squared error discussed previously. The right-view image data is used for this procedure. At block 640, the reference frame is constructed using the procedure discussed in connection with FIG. 5. The right-view image data is also used for this procedure.

At block 650, the newly-constructed reference frame is searched to determine best-match macroblocks. That is, a search range is defined in the reference frame over which each macroblock is compared to a right-view macroblock which is currently being coded to determine the one reference frame macroblock which most closely matches the right-view macroblock which is currently being coded. Since the reference frame is offset relative to the original left-view image, it more closely resembles the right-view image, and a reduced search range may be used to obtain the best match macroblock. For example, as discussed in connection with FIG. 9 below, the search range may be reduced from 64×48 pixels to 8×8 pixels, for example.

At block 660, the right-view image is encoded using known techniques, such as those disclosed in the MVP standard. At block 670, the encoded data and the offset x are transmitted to a decoder, e.g., in a satellite broadcast CATV network, as discussed in connection with FIG. 7. Some video communication standards may not provide for the transmission of the offset value x, in which case the offset can be used only at the encoder to reduce the search range.

Figure 7:
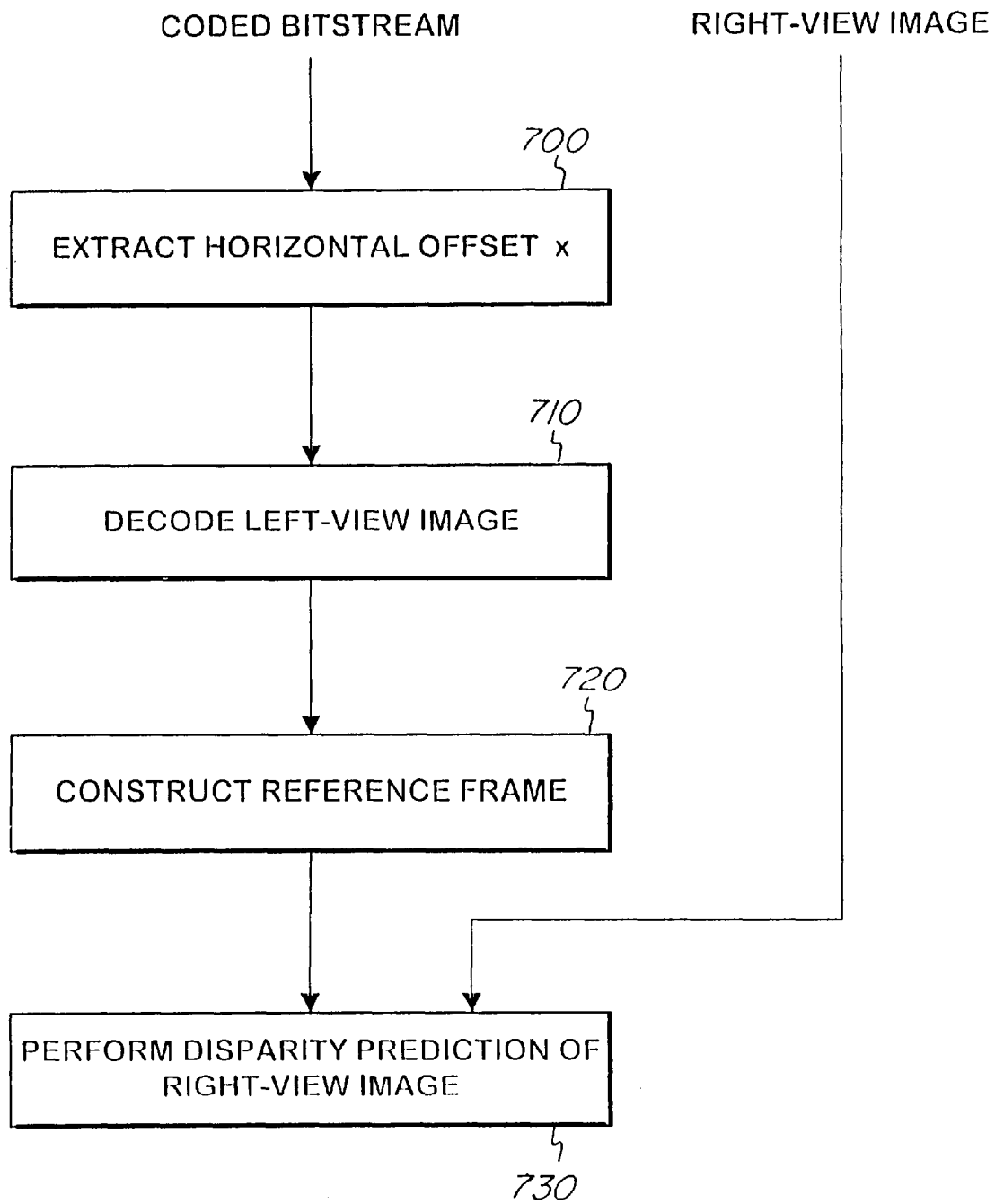
FIG. 7 illustrates a decoder process flow in accordance with the present invention.

FIG. 7 illustrates a decoder process flow in accordance with the present invention. In this case, the offset x is assumed to be transmitted with the video data in a coded bitstream. At block 700, the horizontal offset is extracted from the coded bitstream. At block 710, the left-view image is decoded in a conventional manner. At block 720, the reference frame is constructed using the offset x. At block 730, the right-view image is disparity predicted using the encoded right-view image data and the reference frame. The offset x and motion vectors are used to identify the best-match macroblocks of the reference frame, and the full right-view image is recovered using the sum of the pixel data of the best-match macroblocks and the differentially encoded right-vew image data.

For cases where the horizontal offset can not be transmitted, e.g. with the MPEG-2 MVP standard, the horizontal offset can still be used to reduce the complexity of the disparity vector search in the encoder, e.g., by reducing the motion vector search range.

FIG. 8 illustrates disparity prediction and motion vector searching in accordance with the present invention. The enhancement layer includes a P-picture 810, a B-picture 820, and a B-picture 830, while the lower layer includes an I-picture 840, a P-picture 850 and a P-picture 860. Prediction is indicated by the direction of the arrows such that the arrow points from the reference image to the predicted image. For example, each macroblock in the P-picture 850 is predicted using corresponding best-match macroblocks in the I-picture 840.

For each with macroblock, a motion vector $(v_x,v_y)$ indicates the relative displacement of the best-match macroblock to the predicted macroblock. For lower layer prediction, the estimation is centered at a non-offset position of each macroblock. For example, the upper left hand pixel of each predicted macroblock may be taken as the non-offset coordinate (0,0).

The B-picture 820 is disparity predicted using the P-picture 850 in the lower layer and temporally predicted using the P-picture 810 in the enhancement layer. For disparity prediction, the horizontal offset x is determined as discussed. Next, macroblocks in the B-picture 820 are disparity predicted by locating best-match macroblocks in the P-picture 850, where the disparity estimation/prediction is centered on (x,0) rather than (0,0). That is, the estimation is shifted by x pixels to the right.

The disparity vector $(v_x,v_y)$ indicates the positional difference between corresponding macroblocks of pixels of the base layer and the enhancement layer, and is used for reconstruction of the disparity-predicted enhancement layer picture at a decoder. In particular, with the pixel coordinates for a search window macroblock in the enhancement layer being $(x_s,y_s)$, and the pixel coordinates for a corresponding reference window macroblock in the base layer being $(x_r, y_r)$, the disparity vector is $v=(v_x,v_y)=(x_s-x_r, y_s-y_r)$. Thus, the disparity vector is a measure of a positional or translational difference between the search window and the reference window. The disparity vectors may be transmitted in the right view channel data stream for use in reconstructing the disparity-predicted enhancement layer picture at a decoder.

Moreover, the temporal prediction of the B-picture 820 using the P-picture 810 is centered at $(v_x,v_y)$ for each with macroblock.

Figure 9:
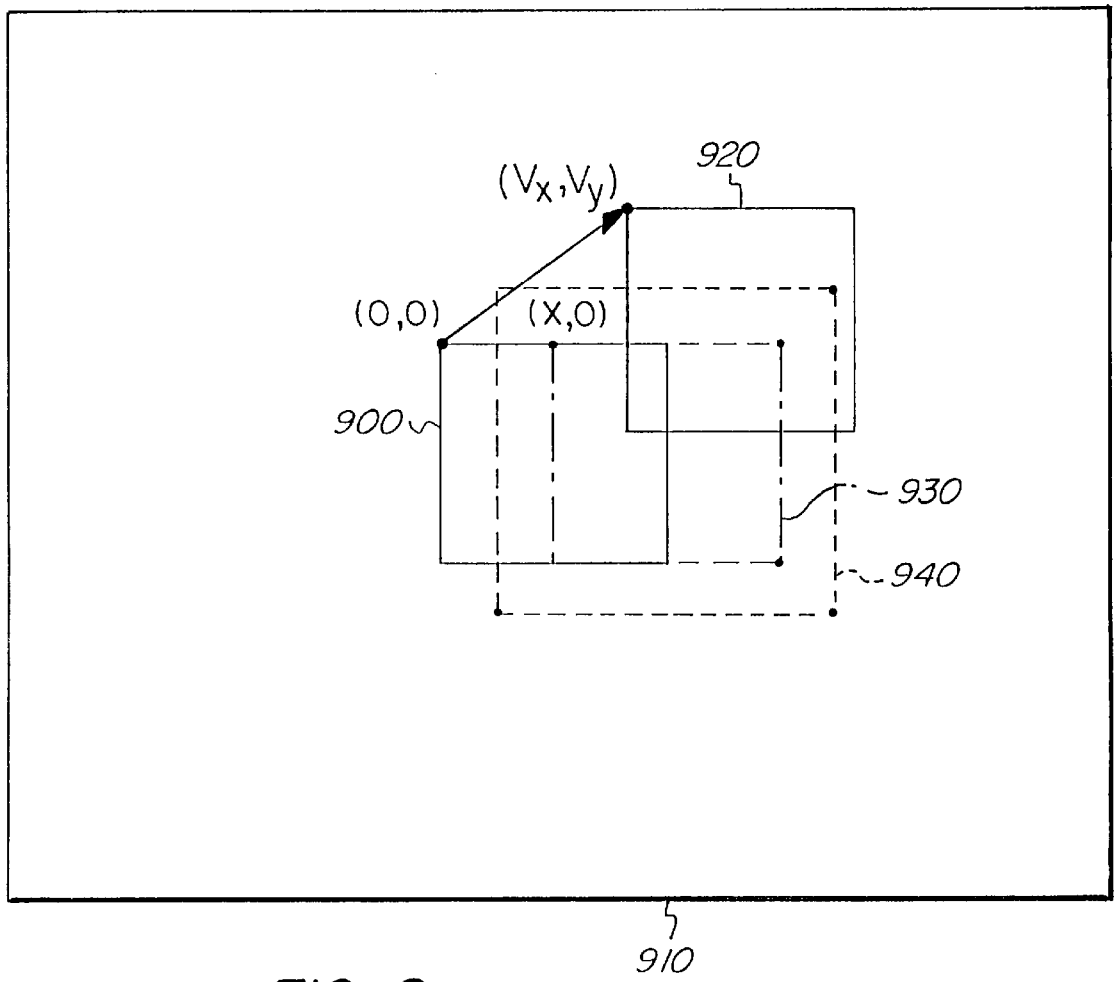
FIG. 9 illustrates motion vector searching in accordance with the present invention.

The disparity prediction and motion vector searching process can be further understood with reference to FIG. 9.

FIG. 9 illustrates motion vector searching in accordance with the present invention. As discussed in connection with FIG. 8, a vector $(v_x,v_y)$ defines a best match macroblock 920 in the I-picture 840 for an with macroblock 900 in the P-picture 850. The vector indicates the amount of temporal movement of an image between the two pictures. A search range 910 is used to find the best match macroblock 920. The search range may have a total size of 82×64 pixels, corresponding to a variation of 64×48 for the 16×16 macroblock 900.

For disparity prediction of macroblocks in the B-picture 820 in the enhancement layer, the with macroblock 930 is centered at (x,0), and is compared to macroblocks in a smaller search range 940, for example, having a total size of 24×24 pixels, corresponding to a variation of 8×8 for a 16×16 macroblock. The offset value x allows a smaller search range to be used since the best-match macroblock for differentially encoding the macroblock 930 is likely to be in a smaller neighborhood of pixels near macroblock 930. Accordingly, a faster processing time and reduced memory requirements can be realized.

Additionally, when the offset value is transmitted to the decoders, more efficient variable length coding (e.g., Huffman coding) of disparity vectors results since each disparity vector is smaller, thereby reducing the amount of data which must be transmitted.

A macroblock in the B-picture 820 which is co-sited with the macroblock 900 in the P-picture 850 can also use a smaller search range in the P-picture 810 which is centered on the macroblock 920 defined by the vector $(v_x,v_y)$. For example, the motion vector search range for the right-view sequence can also be reduced as low as an 8×8 variation. This is true since the correlation between the B-picture 820 and the P-picture 810 is likely to be similar to the correlation between the P-picture 850 and the I-picture 840.

Figure 10:
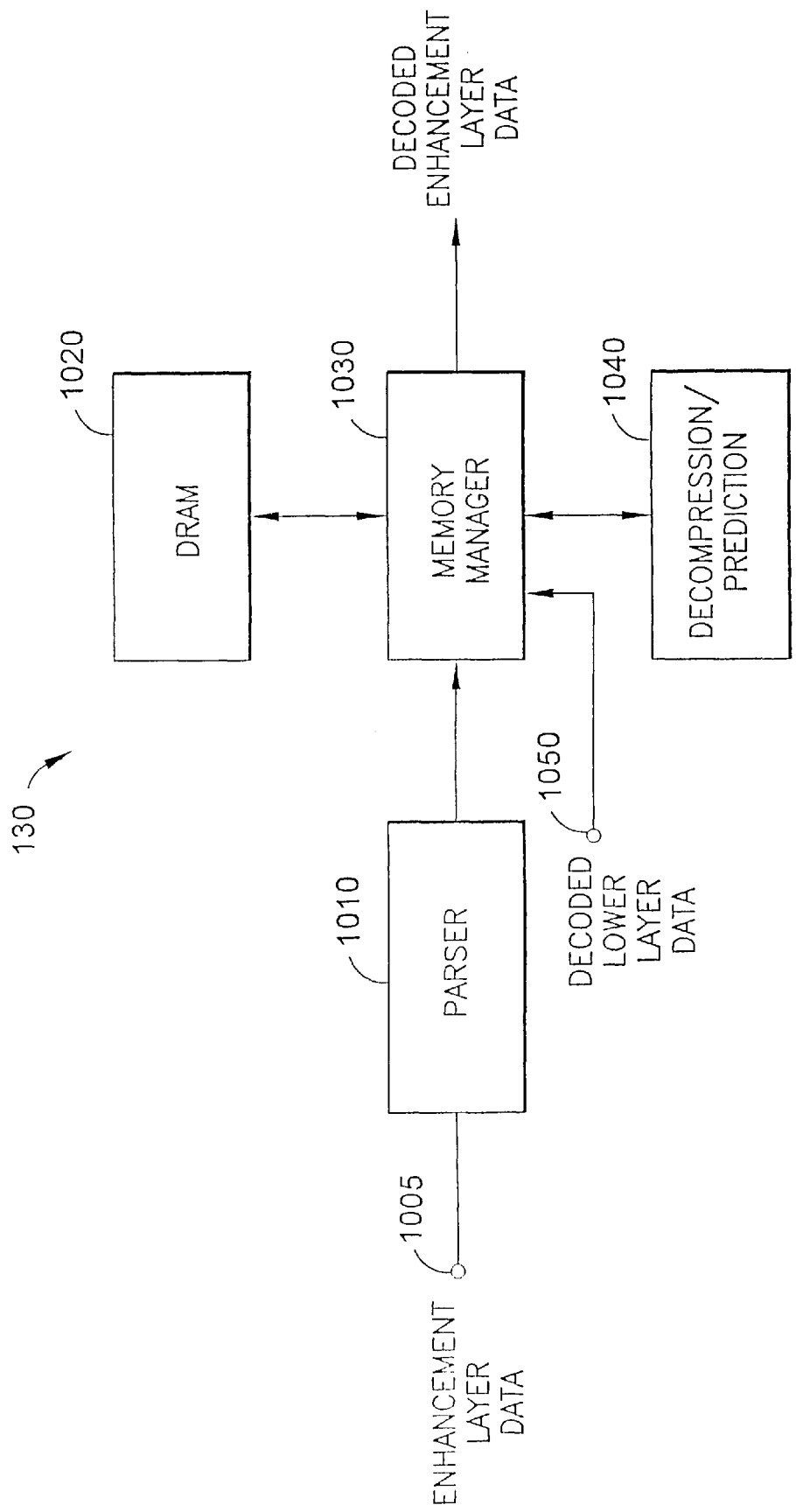
FIG. 10 is a block diagram of an enhancement layer decoder structure in accordance with the present invention.

FIG. 10 is a block diagram of an enhancement layer decoder structure in accordance with the present invention. The decoder, shown generally at 130, includes an input terminal 1005 for receiving the compressed enhancement layer data, and a transport level syntax parser 1010 for parsing the data. The parsed data is provided to a memory manager 1030, which may comprise a central processing unit. The memory manager 1030 communicates with a memory 1020, which may comprise a dynamic random-access memory (DRAM), for example. The horizontal offset x may be communicated with the enhancement layer data or otherwise provided in the stereoscopic video signal. A reference frame is constructed using the decoded lower layer data and the offset x.

The memory manager 1030 also communicates with a decompression/prediction processor 1040, and receives decoded lower level data via terminal 1050 which may be stored temporarily in the memory 1020 for subsequent use by the processor 1040 in decoding the disparity-predicted enhancement layer pictures.

The decompression/prediction processor 1040 provides a variety of processing functions, such as error detection and correction, motion vector decoding, inverse quantization, inverse discrete cosine transformation, Huffman decoding and prediction calculations, for instance. After being processed by the decompression/prediction function 1040, decoded enhancement layer data is output by the memory manager. Alternatively, the decoded data may be output directly from the decompression/prediction function 1040 via means not shown.

An analogous structure may be used for the lower layer. Moreover, the enhancement and lower layer decoders may share common hardware. For example, the memory 1020 and processor 1040 may be shared.

Test results conform that the view offset estimation technique of the present invention can effectively improve coding efficiency for stereoscopic video signals. The offset estimation technique was implemented in a MPEG-2 MVP program and run through the Class D video test sequences of ISO/IEC JTC1/SC29/WG11/MPEG-4 and some other sequences. Examples of test results with an offset search range of X=20 pixels are shown in Table 1. The improvement in coding efficiency over MVP in bits/frame ranges from 2.0 to 5.2%. PSNR indicates the peak signal-to-noise ratio. All picture types are P-pictures.

TABLE 1

| Sequence | Quantization Level Q | PSNR | Total coded bits | Improvement (bits/frame) | Right-view bit rate |
|---|---|---|---|---|---|
| Tunnel: (Offset Values x = 2; Frame No. n = 50-th) | 26 | 31 | 210,818 | 2% | 3 Mbits/sec. |
| Tunnel: (Offset Values x = 2; Frame No. n = 50th) | 33 | 30 | 172,011 | 4% | 2 Mbits/sec. |
| Fun Fair (Offset Values x = 8; Frame No. n = 2nd) | 26 | 31 | 223,939 | 2.3% | 3 Mbits/sec. |

TABLE 1-continued

| Sequence | Quantization Level Q | PSNR | Total coded bits | Improvement (bits/frame) | Right-view bit rate |
|---|---|---|---|---|---|
| Fun Fair (Offset Values x = 8; Frame No. n = 2nd) | 33 | 30 | 181,071 | 5.2% | 2 Mbits/sec. |

Further coding efficiency improvements can be achieved by using a threshold T to zero the residual macroblock after compensation, or zero some high frequency DCT coefficients.

As can be seen, the present invention provides a system for estimating the optimal offset x of a scene between right and left channel views at the same temporal reference point. The system reduces the motion vector search range for disparity (i.e., cross-channel or cross-layer) prediction to improve coding efficiency. The offset may be recalculated when there is a scene change or a new group of pictures in the lower layer.

At an encoder, the optimal offset, x, between the enhancement layer image and the lower layer image is determined according to either a minimum mean error between the enhancement and lower layer images, or a minimum mean squared error between the enhancement and lower layer images. The offset x is bounded by an offset search range X. The x rightmost pixel columns of the lower layer image are deleted, and the x leftmost columns of the lower layer image are padded to effectively shift the lower layer image to the right by x pixels to obtain the reference image for use in disparity predicting the enhancement layer image. For arbitrarily shaped images such as VOPs, a VOP in a left-view image is shifted to the right by deleting the x leftmost pixels which extend vertically on the VOP, and padding x pixels starting at the rightmost edge of the VOP.

The reference frame is searched to obtain best-match macroblocks, and the right-view data is differentially encoded. At a decoder, the offset value x is recovered if available and used to reconstruct the reference frame for disparity prediction.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for predicting an enhancement layer image in an enhancement layer of a stereoscopic video signal using a lower layer image in a lower layer thereof, comprising the steps of:

determining an optimal offset, x, between said enhancement layer image and said lower layer image according to one of (a) a minimum mean error between pixel values of said enhancement layer image and said lower layer image, and (b) a minimum mean squared error between pixel values of said enhancement layer image and said lower layer image; and shifting said lower layer image according to said optimal offset to obtain a reference image for use in disparity predicting the enhancement layer image.

2. The method of claim 1, wherein:

the enhancement layer image is disparity predicted from said reference image using motion compensation; and a best-match image is obtained in said reference image using a search range which is reduced relative to a search range of said lower layer image without said shifting.

3. The method of claim 1, comprising the further steps of:

determining an estimated offset according to at least one of a camera focus parameter and an inter-ocular separation; and searching within said lower layer image in a range determined by said estimated offset to find said optimal offset.

4. The method of claim 1, comprising the further step of:

searching within a horizontal offset range X to find said optimal offset x such that $0 \leq x \leq X$.

5. The method of claim 1, wherein:

said enhancement layer image and said lower layer image comprise a video object plane.

6. The method of claim 1, wherein:

said enhancement layer image and said lower layer image are arbitrarily shaped.

7. The method of claim 6, wherein said shifting step comprises the steps of:

deleting a leftmost edge region of the VOP which has a width of x pixels; and and padding a rightmost edge portion of the VOP to extend the rightmost edge portion by a width of x pixels.

8. The method of claim 1, wherein said shifting step comprises the steps of:

deleting x rightmost pixel columns of the lower layer image; and padding a leftmost portion of the lower layer image with x pixel columns.

9. The method of claim 1, comprising the further steps of:

determining a new optimal offset x when a scene change is detected for the lower layer image; and if a scene change is not detected, using an offset from a prior image in said lower layer as said optimal offset x.

10. The method of claim 1, wherein:

a new optimal offset x is determined for a new group of pictures in the lower layer.

11. The method of claim 1, comprising the further step of:

transmitting said optimal offset x in said stereoscopic video signal for use by a decoder in recreating the reference image.

12. The method of claim 1, wherein:

for said minimum mean error, said optimal offset x is determined such that the value $$Dist\_L^1(x) = \frac{1}{h(w-x)} \sum_{i=0}^{(w-x-1)} \sum_{j=0}^{(h-1)} |\{y_L(i+x, j) - y_E(i, j)|$$

is minimized, where $y_L$ and $y_E$ represent luminance pixel values of the lower and enhancement layer images, respectively, i and j are horizontal and vertical Cartesian coordinates, respectively, in the lower and enhancement layer images, h is the height of the lower layer image, w is the width of the lower layer image, said lower layer image is a left-view image and said enhancement layer image is a right-view image.

13. The method of claim 12, wherein:

for said minimum mean error, an optimal offset for chrominance pixel values is $\lfloor x/2 \rfloor$.

14. The method of claim 1, wherein:

for said minimum mean squared error, said optimal offset x is determined such that the value $$Dist\_L^2(x) = \frac{1}{h(w-x)} \sum_{i=0}^{(w-x-1)} \sum_{j=0}^{(h-1)} \{y_L(i+x, j) - y_E(i, j)\}^2$$

is minimized, where $y_L$ and $y_E$ represent the luminance pixel values of the lower and enhancement layer images, respectively, i and j are horizontal and vertical Cartesian coordinates, respectively, in the lower and enhancement layer images, h is the height of the lower layer image, and w is the width of the lower layer image, said lower layer image is a left-view image and said enhancement layer image is a right-view image.

15. The method of claim 14, wherein:

for said minimum mean squared error, an optimal offset for chrominance pixel values is $\lfloor x/2 \rfloor$.

16. An apparatus for predicting an enhancement layer image in an enhancement layer of a stereoscopic video signal using a lower layer image in a lower layer thereof, comprising:

means for determining an optimal offset, x, between said enhancement layer image and said lower layer image according to one of (a) a minimum mean error between pixel values of said enhancement layer image and said lower layer image, and (b) a minimum mean squared error between pixel values of said enhancement layer image and said lower layer image; and means for shifting said lower layer image according to said optimal offset to obtain a reference image for use in disparity predicting the enhancement layer image.

17. The apparatus of claim 16, wherein:

the enhancement layer image is disparity predicted from said reference image using motion compensation; and a best-match image is obtained in said reference image using a search range which is reduced relative to a search range of said lower layer image without said shifting.

18. The apparatus of claim 16, further comprising:

means for determining an estimated offset according to at least one of a camera focus parameter and an inter-ocular separation; and means for searching within said lower layer image in a range determined by said estimated offset to find said optimal offset.

19. The apparatus of claim 16, further comprising:

means for searching within a horizontal offset range X to find said optimal offset x such that $0 \leq x \leq X$.

20. The apparatus of claim 16, wherein:

said enhancement layer image and said lower layer image comprise a video object plane.

21. The apparatus of claim 16, wherein:

said enhancement layer image and said lower layer image are arbitrarily shaped.

22. The apparatus of claim 21, wherein said means for shifting deletes a leftmost edge region of the VOP which has a width of x pixels, and pads a rightmost edge portion of the VOP to extend the rightmost edge portion by a width of x pixels.

23. The apparatus of claim 16, wherein said means for shifting deletes x rightmost pixel columns of the lower layer image, and pads a leftmost portion of the lower layer image with x pixel columns.

24. The apparatus of claim 16, further comprising means for:

(a) determining a new optimal offset x when a scene change is detected for the lower layer image; and (b) if a scene change is not detected, using an offset from a prior image in said lower layer as said optimal offset x.

25. The apparatus of claim 16, wherein:

a new optimal offset x is determined for a new group of pictures in the lower layer.

26. The apparatus of claim 16, further comprising:

means for transmitting said optimal offset x in said stereoscopic video signal for use by a decoder in recreating the reference image.

27. The apparatus of claim 16, wherein:

for said minimum mean error, said optimal offset x is determined such that the value $$Dist\_L^1(x) = \frac{1}{h(w-x)} \sum_{i=0}^{(w-x-1)} \sum_{j=0}^{(h-1)} |\{y_L(i+x, j) - y_E(i, j)|$$

is minimized, where $y_L$ and $y_E$ represent luminance pixel values of the lower and enhancement layer images, respectively, i and j are horizontal and vertical Cartesian coordinates, respectively, in the lower and enhancement layer images, h is the height of the lower layer image, w is the width of the lower layer image, said lower layer image is a left-view image and said enhancement layer image is a right-view image.

28. The apparatus of claim 27, wherein:

for said minimum mean error, an optimal offset for chrominance pixel values is $\lfloor x/2 \rfloor$.

29. The apparatus of claim 16, wherein:

for said minimum mean squared error, said optimal offset x is determined such that the value $$Dist\_L^2(x) = \frac{1}{h(w-x)} \sum_{i=0}^{(w-x-1)} \sum_{j=0}^{(h-1)} \{y_L(i+x, j) - y_E(i, j)\}^2$$

is minimized, where $y_L$ and $y_E$ represent the luminance pixel values of the lower and enhancement layer images, respectively, i and j are horizontal and vertical Cartesian coordinates, respectively, in the lower and enhancement layer images, h is the height of the lower layer image, and w is the width of the lower layer image, said lower layer image is a left-view image and said enhancement layer image is a right-view image.

30. The apparatus of claim 29, wherein:

for said minimum mean squared error, an optimal offset for chrominance pixel values is $\lfloor x/2 \rfloor$.

31. A decoder for predicting an enhancement layer image in an enhancement layer of a stereoscopic video signal using a lower layer image in a lower layer thereof, comprising:

means for recovering an optimal offset, x, between said enhancement layer image and said lower layer image from said stereoscopic video signal;

said optimal offset x being determined at an encoder according to one of (a) a minimum mean error between pixel values of said enhancement layer image and said lower layer image, and (b) a minimum mean squared error between pixel values of said enhancement layer image and said lower layer image; and means for shifting said lower layer image according to said optimal offset to obtain a reference image for use in disparity predicting the enhancement layer image.

32. The decoder of claim 31, wherein:

the enhancement layer image is disparity predicted from said reference image using motion compensation; and a best-match image is obtained in said reference image using a search range which is reduced relative to a search range of said lower layer image without said shifting.

33. The decoder of claim 31, wherein:

said enhancement layer image and said lower layer image comprise a video object plane.

34. The decoder of claim 31, wherein:

said enhancement layer image and said lower layer image are arbitrarily shaped.

35. The decoder of claim 34, wherein said means for shifting deletes a leftmost edge region of the VOP which has a width of x pixels, and pads a rightmost edge portion of the VOP to extend the rightmost edge portion by a width of x pixels.

36. The decoder of claim 31, wherein said means for shifting deletes x rightmost pixel columns of the lower layer image, and pads a leftmost portion of the lower layer image with x pixel columns.

37. The decoder of claim 31, wherein:

for said minimum mean error, said optimal offset x is determined such that the value $$Dist\_L^1(x) = \frac{1}{h(w-x)} \sum_{i=0}^{(w-x-1)} \sum_{j=0}^{(h-1)} |\{y_L(i+x, j) - y_E(i, j)|$$

is minimized, where $y_L$ and $y_E$ represent luminance pixel values of the lower and enhancement layer images, respectively, i and j are horizontal and vertical Cartesian coordinates, respectively, in the lower and enhancement layer images, h is the height of the lower layer image, w is the width of the lower layer image, said lower layer image is a left-view image and said enhancement layer image is a right-view image.

38. The decoder of claim 37, wherein:

for said minimum mean error, an optimal offset for chrominance pixel values is $\lfloor x/2 \rfloor$.

39. The decoder of claim 31, wherein:

for said minimum mean squared error, said optimal offset x is determined such that the value $$Dist\_L^2(x) = \frac{1}{h(w-x)} \sum_{i=0}^{(w-x-1)} \sum_{j=0}^{(h-1)} \{y_L(i+x, j) - y_E(i, j)\}^2$$

is minimized, where $y_L$ and $y_E$ represent the luminance pixel values of the lower and enhancement layer images, respectively, i and j are horizontal and vertical Cartesian coordinates, respectively, in the lower and enhancement layer images, h is the height of the lower layer image, and w is the width of the lower layer image, said lower layer image is a left-view image and said enhancement layer image is a right-view image.

40. The decoder of claim 39, wherein:

for said minimum mean squared error, an optimal offset for chrominance pixel values is $\lfloor x/2 \rfloor$.

* * * * *

UNITED STATES PATENT AND TRADEMARK OFFICE
CERTIFICATE OF CORRECTION

PATENT NO. : 6,043,838
DATED : March 28, 2000
INVENTOR(S) : Chen

It is certified that error appears in the above-identified patent and that said Letters Patent is hereby corrected as shown below:

Drawings,
Figure 2, reference numeral "100" is changed to -- 200 --.
Figure 2, reference numeral "110" is changed to -- 210 --.
Figure 2, reference numeral "115" is changed to -- 215 --.
Figure 2, reference numeral "120" is changed to -- 220 --.
Figure 2, reference numeral "125" is changed to -- 225 --.
Figure 2, reference numeral "130" is changed to -- 230 --.
Figure 2, reference numeral "140" is changed to -- 240 --.

Column 4,
Line 45, after "value", -- below is minimized -- is inserted.

Column 5,
Line 61, "125" is changed to -- 225 --.
Line 61, "115" is changed to -- 215 --.
Line 62, "100" is changed to -- 200 --.
Line 62, "120" is changed to -- 220 --.
Line 62, "110" is changed to -- 210 --.
Line 62, "130" is changed to -- 230 --.
Line 62, "115" is changed to -- 215 --.
Line 63, "125" is changed to -- 225 --.
Line 63, "140" is changed to -- 240 --.
Line 64, "100" is changed to -- 200 --.

Column 6,
Line 5, "110" is changed to -- 210 --.
Line 5, "120" is changed to -- 220 --.

Column 7,
Line 42, "$0<x<X$" is changed to -- $0 \leq x \leq X$ --.

Line 52, "techniques" is changed to -- technique --.
Line 56, "$0<x<X$" is changed to -- $0 \leq x \leq X$ --.

Column 8,
Line 13, "5, $0\}<i<\{x_{est}+5\}$" is changed to -- 5, $0\} \leq i \leq \{x_{est}+5\}$ --.

Column 9,
Line 10, "$0<x<X$" is changed to -- $0 \leq x \leq X$ --.

UNITED STATES PATENT AND TRADEMARK OFFICE
CERTIFICATE OF CORRECTION

PATENT NO.   : 6,043,838
DATED        : March 28, 2000
INVENTOR(S)  : Chen

It is certified that error appears in the above-identified patent and that said Letters Patent is hereby corrected as shown below:

Column 10,
Lines 3, 34, 41 and 49, "with" is changed to -- ith --.

Column 13,
Line 19, "the" is changed to -- a -- before "VOP".
Line 21, "and" is deleted before "padding".

Column 14,
Line 51, "the" is changed to -- a -- before "VOP".

Column 16,
Line 14, "the" is changed to -- a -- before "VOP".

Signed and Sealed this

Twenty-third Day of April, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,043,838
DATED : March 28, 2000
INVENTOR(S) : Chen

It is certified that error appears in the above-identified patent and that said Letters Patent is hereby corrected as shown below:

Drawings,
Figure 2, reference numeral "100" is changed to -- 200 --.
Figure 2, reference numeral "110" is changed to -- 210 --.
Figure 2, reference numeral "115" is changed to -- 215 --.
Figure 2, reference numeral "120" is changed to -- 220 --.
Figure 2, reference numeral "125" is changed to -- 225 --.
Figure 2, reference numeral "130" is changed to -- 230 --.
Figure 2, reference numeral "140" is changed to -- 240 --.

Column 4,
Line 45, after "value", -- below is minimized -- is inserted.

Column 5,
Line 62, "100" is changed to -- 200 --.
Line 62, "120" is changed to -- 220 --.
Line 62, "110" is changed to -- 210 --.
Line 63, "125" is changed to -- 225 --.
Line 63, "115" is changed to -- 215 --.
Line 64, "130" is changed to -- 230 --.
Line 64, "115" is changed to -- 215 --.
Line 65, "125" is changed to -- 225 --.
Line 65, "140" is changed to -- 240 --.
Line 66, "100" is changed to -- 200 --.

Column 6,
Line 5, "110" is changed to -- 210 --.
Line 5, "120" is changed to -- 220 --.

Column 7,
Line 42, "0<x<X" is changed to -- $0 \leq x \leq X$ --.
Line 52, "techniques" is changed to -- technique --.
Line 56, "0<x<X" is changed to -- $0 \leq x \leq X$ --.

Column 8,
Line 13, "5, 0}<i<{$x_{est}$+5}" is changed to -- 5, 0} $\leq$ i $\leq$ {$x_{est}$+5} --.

Column 9,
Line 10, "0<x<X" is changed to -- $0 \leq x \leq X$ --.

UNITED STATES PATENT AND TRADEMARK OFFICE
CERTIFICATE OF CORRECTION

PATENT NO.    : 6,043,838
DATED         : March 28, 2000
INVENTOR(S)   : Chen

It is certified that error appears in the above-identified patent and that said Letters Patent is hereby corrected as shown below:

Column 10,
Lines 3, 34, 41 and 49, "with" is changed to -- ith --.

Column 13,
Line 19, "the" is changed to -- a -- before "VOP".
Line 21, "and" is deleted before "padding".

Column 14,
Line 51, "the" is changed to -- a -- before "VOP".

Column 16,
Line 14, "the" is changed to -- a -- before "VOP".

This certificate supersedes Certificate of Correction issued April 23, 2002.

Signed and Sealed this

Sixth Day of May, 2003

JAMES E. ROGAN
*Director of the United States Patent and Trademark Office*